United States Patent [19]

Afshar et al.

[11] Patent Number: 5,101,426
[45] Date of Patent: Mar. 31, 1992

[54] TELEPHONE ANSWERING DEVICE WITH IMPROVED END SIGNAL DETECTION

[76] Inventors: Eskandar Afshar, 26100 Narbonne #26, Lomita, Calif. 90717; Mark Karnowski, 7762 Devonwood Ave., Garden Grove, Calif. 92641

[21] Appl. No.: 522,570

[22] Filed: May 14, 1990

[51] Int. Cl.$^5$ ............................................. H04M 1/65
[52] U.S. Cl. ......................................... 379/67; 379/79; 379/88
[58] Field of Search ....................... 379/67, 79, 80, 81, 379/88

[56] References Cited

U.S. PATENT DOCUMENTS

| | | | |
|---|---|---|---|
| 3,728,488 | 4/1973 | Bonsky et al. | 379/81 |
| 3,859,464 | 1/1975 | Seamans | 379/81 |
| 3,935,390 | 1/1976 | Winterhalter | 379/81 |
| 3,941,934 | 3/1976 | Bonsky | 379/81 |
| 4,309,571 | 1/1982 | Chamberlin | 379/80 |
| 4,314,103 | 2/1982 | Wilson | 379/80 |
| 4,860,340 | 8/1989 | Suzuki et al. | 379/67 |
| 5,022,069 | 6/1991 | Chen | 379/67 |

FOREIGN PATENT DOCUMENTS 2092411 8/1982 United Kingdom ................ 379/81

Primary Examiner—James L. Dwyer
Assistant Examiner—Huyen D. Le
Attorney, Agent, or Firm—Lewis Anten

[57] ABSTRACT

A telephone answering device (TAD) detects termination signals (Calling Party Control or CPC signals) on a telephone line by determining which signal is most probably a CPC signal, then comparing suspect signals to the determined signal. A series of memory registers store the value of an initial series of suspected CPC signals when the TAD is initially powered up. The stored values are compared with each other to confirm and validate the CPC signal. Upon finding a sufficiently repeated value, that value is stored and from there on used as the value for the CPC signal. Future signals received that are the same as the determined CPC signal terminate TAD operation.

12 Claims, 5 Drawing Sheets

TELEPHONE ANSWERING DEVICE WITH IMPROVED END SIGNAL DETECTION

BACKGROUND

The normal mode of operation of a Telephone Answering Device (TAD) is as follows:

After a predetermined number of rings, sensed by a ring detection circuit, the TAD goes off-hook and broadcasts an outgoing message that had been prerecorded on an announcement tape. After the end of the playing of the announcement tape a recording means, typically a tape cassette, is activated to record an incoming message from the calling party. The recording can be ended either by limiting the permitted recording time or automatically upon the caller hanging up. The TAD recognizes that the calling party has hung up by one of two automatic termination methods:

a. VOX Circuit detection

A VOX (voice activated) circuit in the TAD disconnects the TAD when no voice signals are detected for a predetermined period of time, typically on the order of more than four seconds. The disadvantages with relying on this method alone is that the TAD may continue to record even after the calling party hangs up if the line is very noisy, and also that there is a waste of four (4) seconds of tape or recording capability. Also, the VOX circuit has no means of distinguishing between legitimate voice messages and recorded information from the telephone network.

b. Calling Party Control (CPC) Signal Detection

Most modern central offices of many telephone companies generate a CPC pulse (a momentary break in the line) indicating that the calling party is no longer on the line. On detecting this signal, some TADs stop recording and disconnect immediately. One disadvantage with this system is that this mechanism will not function in areas where the central offices do not generate CPC signals. A more serious problem arises in those situations where a central office not only generates a CPC signal, but also the signals of custom calling features such as call waiting (or even a pulse of random noise on the line) which could be mistaken for a CPC signal. "Call Waiting is an optional service provided by the telephone company that allows a busy terminal to answer an incoming call by flashing the switch hook. Flashing the switch hook places the existing connection on hold and connects the called terminal to the waiting call" *Bell System Switched Network Capability and Performance Specifications,* Technical Reference Pub. No. 61100, AT&T, 1983. Since in this case, they also generate a momentary break in the line, the telephone line is disconnected prematurely, even while the calling party's message is in the process of being recorded.

The Wilson patent, U.S. Pat. No. 4,314,103, clearly recognizes the difficulties associated with the detection of calling party disconnects. Citing lack of reliable means to detect CPC pulses, the Wilson device uses dial-tone detection in conjunction with voice detection to disconnect the line. This mechanism is inherently slow and in a way defeats its own purpose, which is providing a prompt disconnect.

In the patent to Winterhalter, U.S. Pat. No. 3,935,390, a method for detecting CPC signals is disclosed which relies on measuring the amplitude of the signals at a particular point in the internal circuitry to differentiate between different signals. Such methods have limitations and cannot reliably distinguish between CPC signals and other control signals like "call waiting". The Winterhalter device also lacks the ability to learn and adapt to the line and signal characteristics experienced by the particular TAD.

Some current models of TADs have CPC switches with different settings corresponding to the different durations of time that the value of the CPC signals are likely to fall within.

For example, Panasonic Model KX-T1740 has a CPC switch with two positions A and B, that roughly correspond to ranges greater than 8 milliseconds and greater than 350 milliseconds respectively. When the switch is set to the A position, the TAD assumes that any signal whose duration exceeds 8 milliseconds is a CPC pulse and will disconnect the line, while in the B position any pulse exceeding 350 milliseconds is assumed to be a CPC pulse and will cause the line to disconnect. The user is required to set the switch to one of these positions depending on the line conditions. The switch must be set to the A position if no call waiting service is available or if the user has observed over a period of time that the incoming messages are being interrupted, the switch must be set to the B position. The burden is on the user to figure out by trial and error, which of the positions best match with the line conditions. This is an implicit acknowledgement of the fact that there exists no reliable means to automatically identify the presence of a CPC signal and measure it's duration. Additionally, such an arrangement will not work satisfactorily in situations where the duration of the call waiting pulse exceeds that of the CPC pulse.

SUMMARY OF THE INVENTION

To overcome the problems of the existing mechanisms, the present invention relies on an algorithm to recognize only a valid CPC signal and reject all extraneous signals. The algorithm measures and learns the duration of a valid CPC pulse in the particular line on which the TAD is installed. Since the duration of the real CPC pulse could vary from one central office to another, the present method is more reliable in distinguishing between a CPC signal and custom calling interruptions such as "call waiting". This permits a more reliable functioning of the TAD since it will no longer disconnect a calling party when interrupted by false signals such as call waiting or noise. Also a more efficient usage of the recording tape is realized because the wait time of 4 seconds typically encountered in other automatic termination programs used on TAD's after each message can be eliminated. The savings in time is particularly significant in TAD's having digital recording where the cost of recording time is significant.

In the present invention, circuitry is provided in association with the TAD that has a "learning mode", whereby when the TAD is first powered up, the circuitry senses a signal that is suspected of being a CPC signal, i.e. any signal having a pulse width greater than 25 milliseconds or some other predetermined value, and stores the value of the duration of the suspected signal in one of a finite series of registers. One register is filled on reception of each call until all of the registers are filled. Comparison circuitry then compares the values of the suspected CPC signals stored in each of the registers with the values stored in each of the other registers. An algorithm assumes that finding the same value signal in a specified number of the registers is a valid CPC signal, transfers that value of that signal to the microprocessor where it is stored in RAM. Thereafter, when the TAD senses a CPC signal which was stored in the microprocessor the TAD treats that signal as a valid CPC signal and operation of the TAD is terminated.

In the preferred embodiment of the invention, there are five registers and five suspected CPC samples are stored, one in each of the registers. The algorithm compares the suspected CPC signals stored to find a match with a tolerance of +/−25 milliseconds. In order to establish a valid CPC signal, it is necessary to find at least three matches in the five signals. Upon the finding of such three matches, the average value of the matching pulses is assumed to be a proper CPC signal and it is stored in the RAM of the TAD microprocessor. The value of the matching signals may be averaged before storing in the microprocessor.

The likelihood that three such matching signals are CPC signals is increased by the fact that random noise is not of uniform duration and call waiting signals are also generally non uniform in duration. Although CPC signals vary from central office to central office, CPC signals are typically in the order of 150 milliseconds in duration while call waiting signals are typically from 200-275 milliseconds in duration. Any signal having a duration in excess of 600 milliseconds is automatically assumed to be a valid CPC signal and the operation of the TAD is terminated, assuming that no call waiting or other prior signal has been detected, as will be discussed in the following specifications. In such an instance, the value stored in the microprocessor as a result of the learning mode need not be used for purposes of termination.

Further, since the system only permits the filling of one of the registers during each off hook operation of the TAD, it is unlikely that there would be a significant number of call waiting signals during the initial period that the registers are being filled in the Learning Mode. Accordingly it is unlikely that any signal other than a CPC signal would appear in the registers and have the same value as one another so that the comparison circuit would find the required number of matches.

In the event that there are not at least three matches, or some other predetermined number of matches, then that would indicate that there was not a CPC signal present on the phone system connected to the TAD and the end signal detection learning mode of the TAD would not be used in that location and the TAD would operate in the same manner as a conventional TAD.

In a further embodiment of the present invention, the registers are emptied in the event that the predetermined number of matches are not found. The registers would then be filled again during the next series of calls and the new values stored and compared with one another.

In still a further embodiment the registers would be emptied only if a match of some number less than the predetermined number of matches was found. This would indicate the possibility of a CPC signal being transmitted by the central office and prevent the increased likelihood that a false CPC signal would be stored in the microprocessor of the TAD which would cause the TAD to interpret the receipt of such a signal as being a "valid" CPC signal and then terminating the operation of the TAD when the false CPC signal, such as a call waiting signal, is received. One way of overcoming the permanent effect of the false CPC signal being stored in the microprocessor and causing continual improper termination would be to periodically, from time to time, such as once a month, have the registers empty and recycle, replacing the original signal in the microprocessor with the new signal. This would prevent the receipt of a faulty signal from permanently effecting the operation of the system and would also cause the TAD to automatically adapt if the telephone company did institute a CPC system after the initial installation of the TAD.

A problem arises if while a person is recording a message on a TAD a call waiting signal from a second party should be received. If the second party hangs up it will generate a CPC pulse on the line. Upon detecting this CPC pulse, the TAD will disconnect the line, thereby cutting off the first party who was in the process of recording his message on the TAD, even though the CPC was generated by the second party. Existing TADs have no way of determining which party generated the CPC and hence no way of solving the problem.

The present invention uses an integrated CPC pulse/voice detection method that can not only distinguish between CPC and call waiting signals, but also identify the correct source of the CPC signals. The routine takes into account the possibility that the person initiating the call waiting pulse might hang up and generate a CPC pulse. Therefore, in those situations where a valid CPC pulse is encountered after a non CPC signal during the recording mode, the routine checks to see if voice signals are present (i.e. the recording is still in progress). If it is, the first CPC signal will be ignored. If on the other hand, no voice signals are detected for a predetermined amount of time, it is assumed that the interrupting signal is a legitimate CPC pulse generated by the party that just finished recording the message and hungup. Only then, does the routine disconnect the line, as is logically expected. Thus the routine ensures the proper functioning of the TAD.

OBJECTS OF THE PRESENT INVENTION

It is an object of the present invention to provide a TAD that is more reliable.

It is an another object of the present invention to provide a TAD that is less likely to be erroneously disconnected.

It is another object of the present invention to provide a TAD that is automatic in operation, not requiring the user to program the TAD.

It is yet another object of the present invention to provide a TAD that may be used on systems with and without CPC.

It is another object of the present invention to provide a TAD that is self correcting;

It is another object of the present invention to provide a TAD that can distinguish between a termination signal from a first party and a second call waiting party.

It is another object of the present invention to provide a TAD that is quicker in operation.

It is another object of the present invention to provide a TAD that does not involve expensive circuitry.

These and other objects of the present invention will be evident from a review of the specifications and accompanying drawings.

DETAILED DESCRIPTION OF THE DRAWINGS

Figure 1:
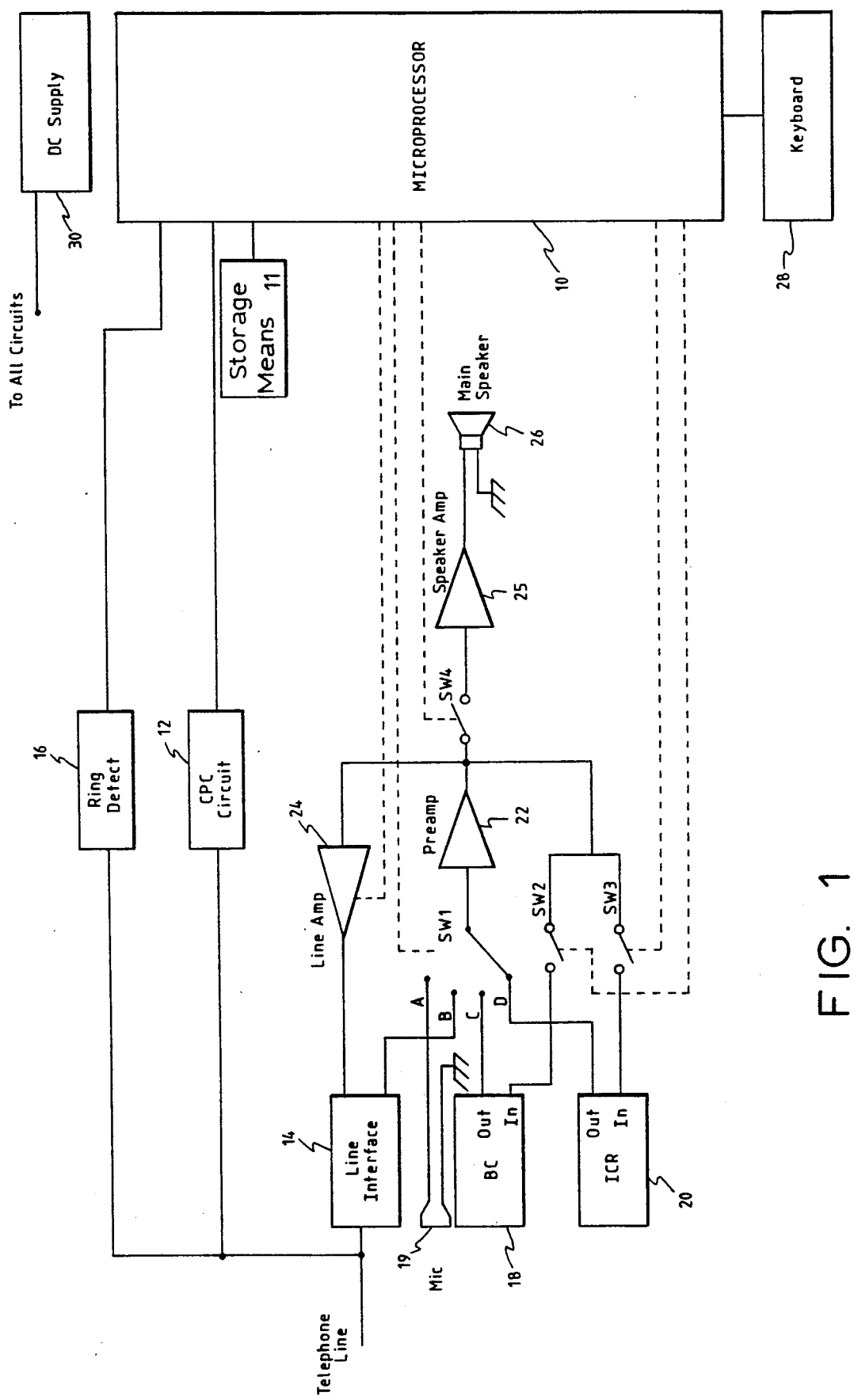
FIG. 1 is a block diagram of the TAD device of the present invention.
Figure 3:
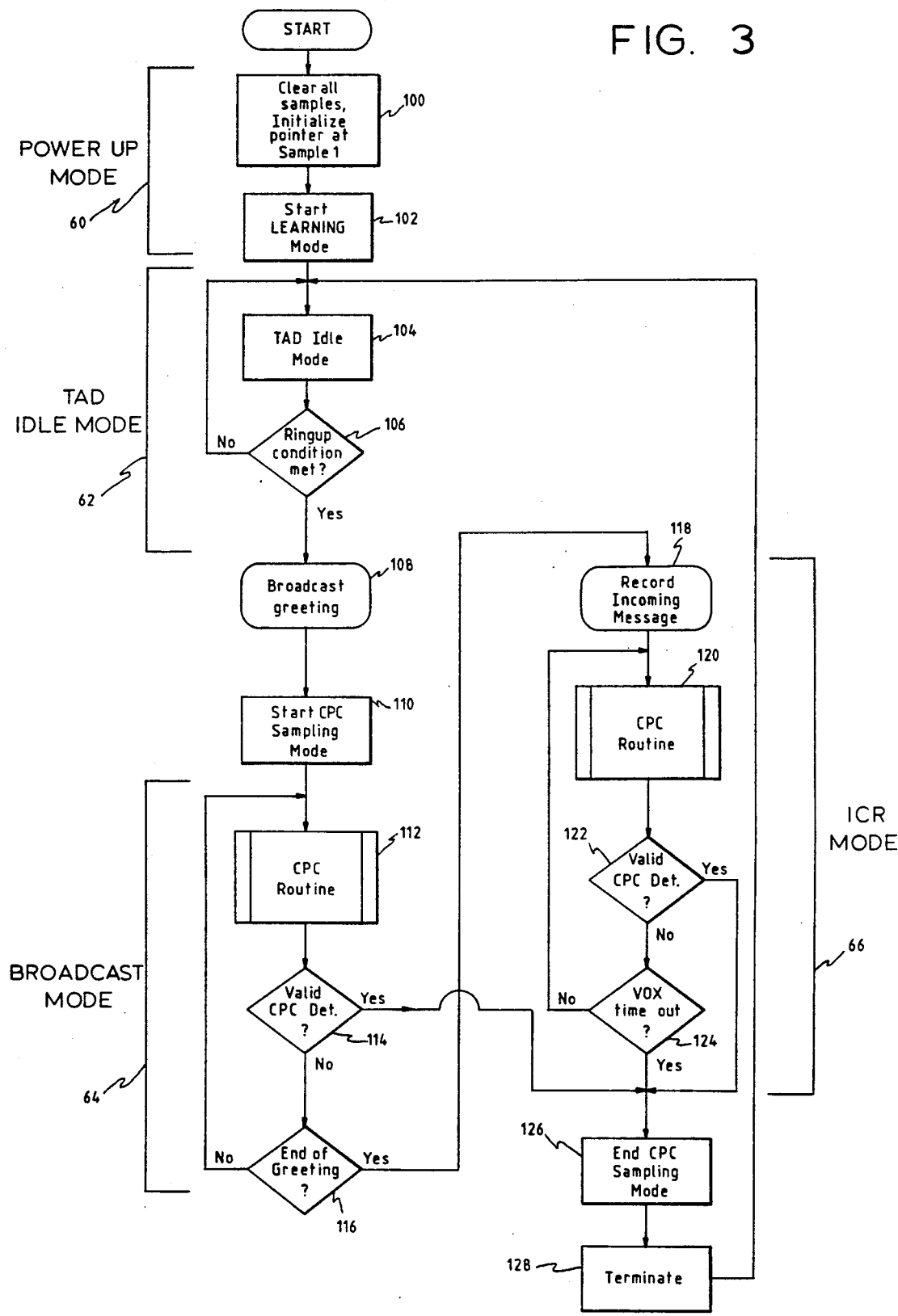
FIG. 3 is a flow chart of the operation of the TAD of the present invention.
Figure 4:
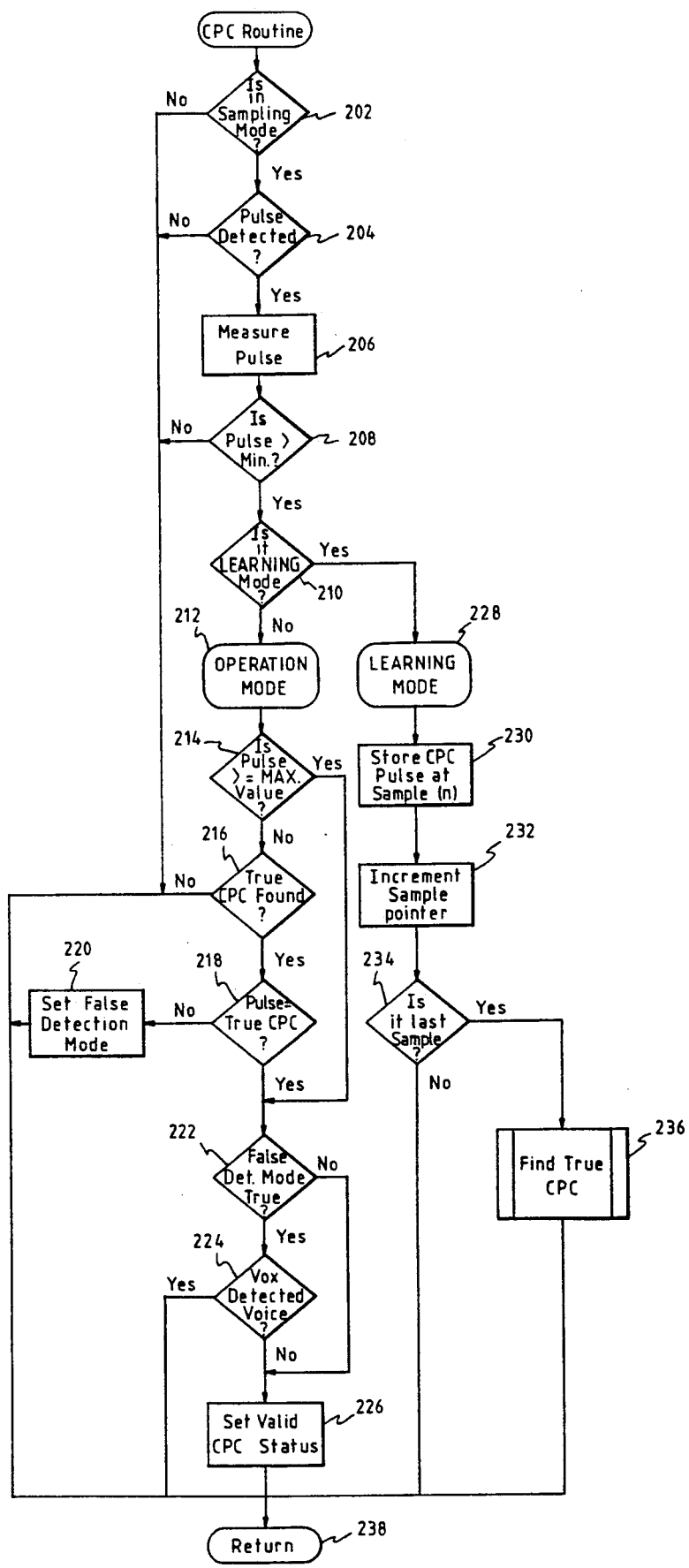
FIG. 4 is a flow chart logic of the CPC routine of the present invention.
Figure 5:
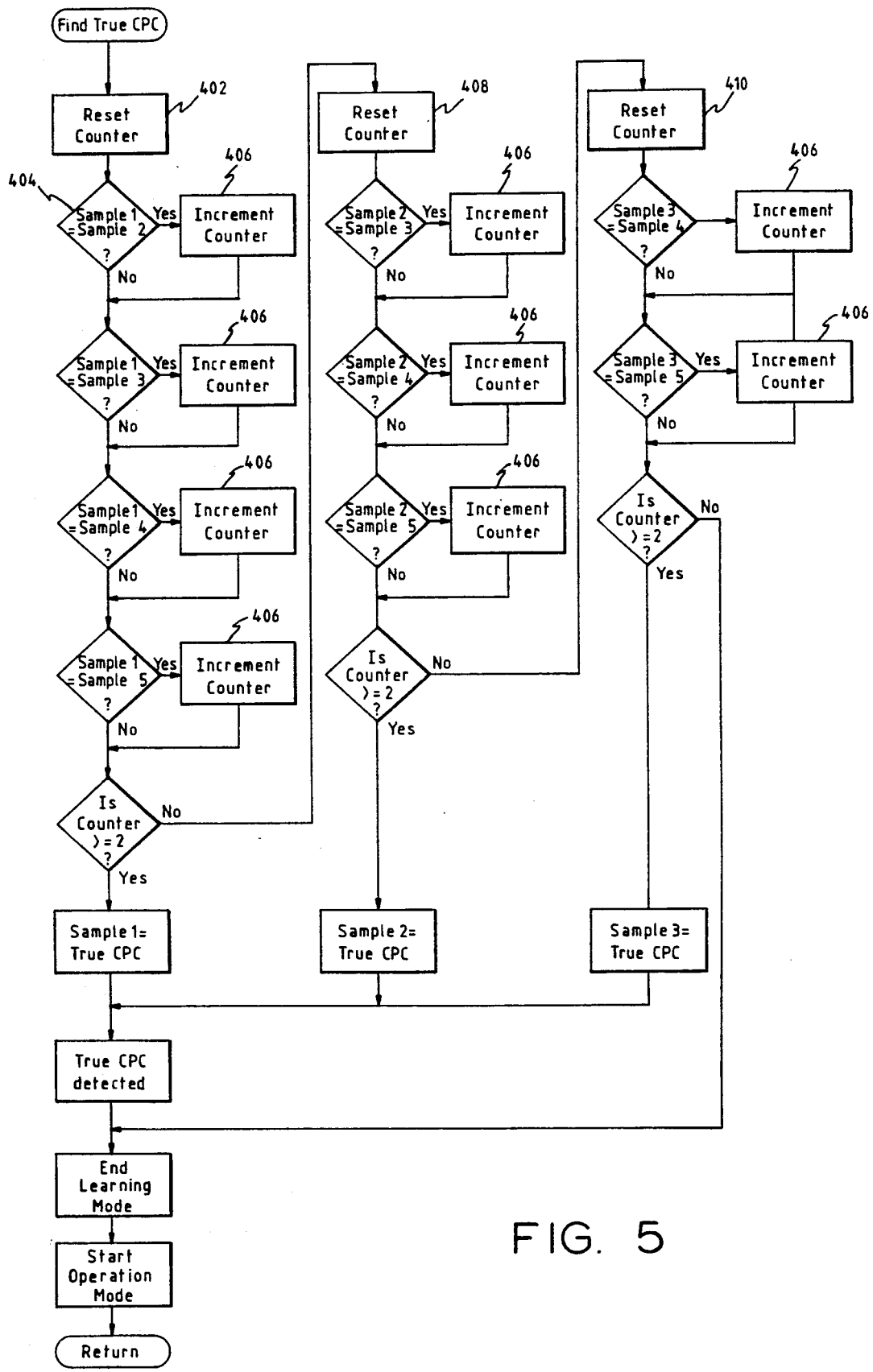
FIG. 5 is a flow chart of the algorithm used in determining the CPC signal in the preferred embodiment of the present invention.

Referring to FIG. 1, the block diagram of a typical TAD with the CPC circuit of the present invention is shown. The components and operation of a typical TAD are well known in the art and will not be described in detail. A brief description of each block follows:

A Microprocessor 10, provides general control of the TAD and includes the software part of the CPC algorithm which is disclosed in the flow charts of FIGS. 3, 4 and 5. Storage means 11 are connected to the microprocessor 10, providing the microprocessor with available memory registers. Such memory registers are also known in the art to be included with the microprocessor 10.

Figure 2:
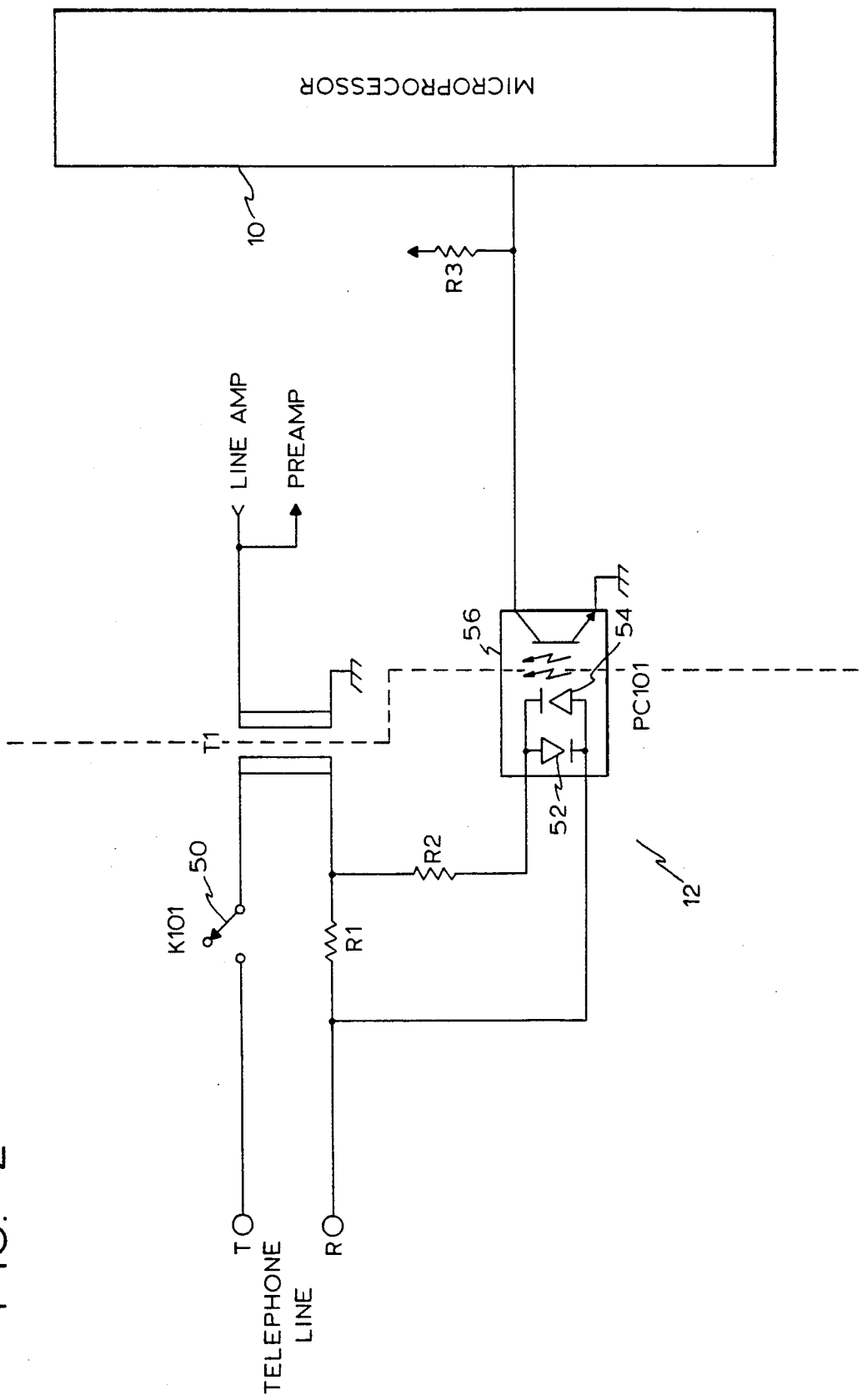
FIG. 2 is a schematic diagram of the CPC circuit of the present invention.

A CPC Circuit 12, shown in detail in FIG. 2, detects an interruption or break in the loop current, and provides a signal (logic level) to the microprocessor 10 upon detecting it.

A Line Interface 14, which couples the audio signal from the telephone line to the audio circuitry of the telephone answering machine.

A Ring Detect circuit 16, which detects the ring signal on the telephone line, and provides a signal (logic level) to the microprocessor 10 upon detecting it;

An Outgoing Message block 18, which delivers an announcement (prerecorded through microphone 19) to the caller, prompting the caller to leave a message;

An Incoming Message block 20, which records the caller's message through its input terminal and plays back the message through its out terminal;

Switches SW1-SW4, which are controlled by the microprocessor 10 to provide a path for the audio signals that corresponds to the operative state of the telephone answering machine;

A Preamp 22, which amplifies the tape or line audio signal, in preparation for playback or record;

A Line Amp 24, which is enabled by the microprocessor 10 to send the output signal of the Preamp 22 to the telephone line;

A Speaker Amp 25, which amplifies the audio signal so that it can be played back through the main speaker 26;

A Keyboard 28, connected to the microprocessor, which allows the user to manually operate the unit; and A DC Power Supply 30, that provides electrical power to the above-mentioned circuitry.

Although there can be variations in the implementation of the CPC circuit in different models of the TAD, the basic operation remains the same and FIG. 2 shows a typical circuit. A description of the circuit 12 is as follows:

During idle mode, when the microprocessor 10 has detected a predetermined number of rings from the ring detect circuit 16, the Telephone Answering Device (TAD) goes offhook by closing the line seizure relay K101. Closing the switch 50 causes the current to flow from the Tip terminal through the transformer T1 and the resistor R1 to the Ring terminal and so closing the loop between the TAD and the central office. Inspection of this circuit shows that resistor R2 and the two LED's 52 and 54 are in parallel with R1. This causes some current to flow through R2 and one of the LED's depending on the polarity of the Tip and the Ring terminals. This current flowing through the LED of the Photo Coupler 56, saturates its transistor and causes the collector of this transistor (Pin 3 of PC101) to be pulled to ground which represents a logic low to the microprocessor 10.

When the Central Office causes a break in the loop current by sending a control signal such as call waiting or a CPC pulse, current stops flowing for finite period of time. This period can range from 8 milliseconds to more than one second. This causes the photo coupler 56 of PC101 to be cutoff and therefore the collector of the transistor will be pulled to supply voltage which represents a logic high to the microprocessor 10.

In this manner, the microprocessor 10 can accurately measure the duration of any interruption by monitoring the CPC input.

FIG. 3 illustrates the operation of a TAD in four basis modes, which are:
1. POWER UP MODE 60;
2. TAD IDLE MODE 62;
3. BROADCAST MODE 64;
4. ICR (INCOMING CALL RECORD) MODE 66.

At the start of the routine, the TAD is powered up and CPC registers are cleared and initialized 100. The routine starts LEARN MODE 102 and then proceeds to the IDLE MODE 104 to check for incoming rings 106. When 'ring-up conditions' are satisfied, the unit goes off-hook and starts playing the prerecorded announcement tape 108. After the line is stabilized, the algorithm starts CPC sampling mode 110 and goes into the Broadcast Mode 64.

In the Broadcast Mode 64, the CPC routine shown in FIG. 4 is called at 112 and at 114, the algorithm checks to see if a valid CPC pulse has been detected. If it has been detected, the Broadcast Mode 64 ends the sampling mode 126. Then 128, the TAD is initialized and goes back into the Idle Mode 104. If a CPC pulse has not been detected 114, it checks for the end of greeting at 116. If the greeting 116 has not ended yet, the Broadcast Loop is repeated 112.

If the greeting 116 has ended before the detection of a valid CPC pulse, the unit goes into the ICR Mode 66. In the ICR Mode 66, the incoming message is recorded 118 and the CPC routine is called at 120. At the end of the CPC routine, the algorithm checks to see if a valid CPC pulse has been detected at 122. If it is affirmative, the CPC sampling mode is stopped 126. Otherwise, it checks for the VOX time out 124. If the Vox time out has not occurred, the ICR Loop 66 is repeated, starting at 120. But if the Vox time out 124 has occurred, the CPC sampling mode is stopped at 126 and the unit terminates 128. Upon termination, the TAD will go back into Idle Mode at 104.

Referring to FIG. 4, the operation of the CPC routine is described. The first operation of the CPC routine, is to determine if the answering machine is in the sampling mode 202. If it is not in the sampling mode, the routine is exited. If it is in the sampling mode, the algorithm checks to see if a possible pulse has been detected 204. Any pulse found is measured 206 and checked 208 to make sure that it is not a spurious noise signal. The pulse is deemed to be valid if its duration exceeds a predetermined value, which in the present invention has been set at 25 milliseconds. It is to be noted, however, that this value can be set at any suitable value.

If the pulse is found to exceed the minimum value, the routine goes into one of two modes 210-Learn Mode 228 or Operation Mode 212.

The main purpose of the Learn Mode 228 is to enable the microprocessor 10 to learn and correctly identify a valid CPC pulse and distinguish it from other control signals such as "call waiting". In the Learn Mode 228, once on each of the calls after power up, the value of the duration of the first pulse in excess of 25 milliseconds is stored in one of the N sample registers (Registers 1, 2, ..., N−1) at 230. This process is continued until all of the registers are filled. Then the values stored in each of the sample registers 226 are compared with one another to see if the stored values of more than a predetermined number of samples match their values within a certain tolerance range, which in the preferred embodiment is +/−25 milliseconds. If so, the Learn Mode 228 assumes that the true value of the CPC has been identified and the value is stored in the microprocessor 10. Since the purpose of the Learn Mode 228 has been fulfilled, the algorithm clears the Learn Mode 228 and all future invocations of the CPC routine will take the algorithm directly into the Operation Mode.

As an example, if that there are 5 registers and that the algorithm has been designed such that, in the event that there are 3 or more matching (within 25 milliseconds of each other,) values stored in the registers, the microprocessor 10 will accept it as a valid CPC value and clear and disable the Learn Mode 228 until the power to the TAD is disconnected. The exact sequence of steps in the Learn Mode 228 is illustrated in FIG. 4 and is described below.

The first operation is to store the value of a suspected CPC pulse in one of the several sample registers. The sample pointer 232 is incremented to indicate the next available register in 230N. If the register in which the current suspected CPC pulse value is being stored is not the last one, the routine continues. If it is determined that the last register, 234, the algorithm begins the process of determining the true CPC value at 236.

FIG. 5 is the flow chart that depicts the algorithm used to determine the true value of the CPC 236 to be stored in the microprocessor 10 using parameters in the above mentioned example. The first step is to reset the counter 402 that keeps track of the number of matching samples. Register 1, the value of CPC pulse in register 1 is compared with sampled signals 2, 3, 4, and 5. Each time the samples match, the counter 406 is incremented. If at the end of the four comparisons, the counter 406 reads 2 or more, it means that 3 or more matching values were found and the algorithm chooses the value of Register 230N as the "valid" CPC value. On the other hand, if the value of Register 230N does not match with any other the counter is reset 408 and Register 2 is compared with samples 3, 4 and 5. If the counter reads 2 or more, sample 2 is chosen as the valid CPC value. But if no matches are found with samples 1 and 2, the counter 406 is again reset 410 sample 3 is compared with samples 4 and 5 and if the conditions described above are satisfied, sample 3 is chosen as the valid CPC value. The number of such comparisons depend on the number of registers used. In the preferred embodiment only three register comparisons are necessary to cover all the possible permutations. In the worst case, where none of the samples match, the algorithm assumes that no valid CPC exists. The Learn Mode 228 is then cleared and the Operation Mode 212 is started.

As indicated above, alternative embodiments of the algorithm may be employed. A further alternative embodiment includes the use of a counter, such as the counter of step 402, that keeps track of the number of times the registers are cleared. When the counter is monitored by the microprocessor 10, the number of times the registers are cleared may be limited to a present value by not subsequently clearing the registers again once the counter reaches the preset value.

In the Operation Mode 212, the first step 214 is to find out if the suspected CPC pulse is greater than or equal to a predetermined value, MAX, in the order of 600 milliseconds, that is chosen to rule out the possibility of any other type of control signal. This could optionally be omitted or the value of MAX could be changed. If the suspected CPC pulse value equals or exceeds MAX, 214 it is treated as a valid CPC.

However, if the value of the pulse is less than MAX, the routine checks 216 to see if a valid CPC as determined by the registers has been stored 218. If no valid CPC had been found in the Learn Mode 228, the routine continues to set the False Detection Mode 220. If the Learn Mode 228 had previously stored a valid CPC value in the microprocessor 10, then the algorithm checks to see if the current CPC value matches (within 25 milliseconds) the valid CPC value 218. If there is a match, it is determined if the False Detection Mode 222 has been set. If it has not been set, then the VOX Circuit 224 is by passed and the set valid CPC status 226 is activated and the recording terminated 238. If the False Detection Mode 222 had been set by a signal less than the MAX and not equal to a valid CPC signal, then the VOX circuit 224 is checked, and if a voice signal is present, the recording continues.

As indicated above, the present invention, as described in reference to the False Detection Mode, has the capability of distinguishing between a first caller and a second caller creating a valid CPC signal. The VOX circuit 224 is only used upon the detection of a signal, such as a call waiting signal, followed by a CPC signal so as to ignore the next CPC signal if there is still voice on the line.

While the above invention has been described with respect to the preferred embodiment and certain alternative embodiments, it is understood that other embodiments and variations of the present invention may be devised which do not depart from the present inventive concept, all of which are intended to be within the scope of the present disclosure.

What is claimed is:

1. An improved telephone answering device having means for responding to a ringing of the telephone so as to activate the playing of an outgoing message and the recording of an incoming message from the caller over the telephone line, and means for terminating the recording of the incoming message upon the caller hanging up, wherein the improvement comprises:

said means for terminating the recording comprising a plurality of memory registers;

circuit means for sampling and storing the value of a first signal in one of said registers, storing a second signal in the next register and so forth in each register until each register stores a signal;

comparison means for comparing the signal in each of said registers and determining if the same signal appears in more than one of said registers' memory;

means for storing said signal that appears more than once in said registers; and second comparison means associated with said termination means for comparing said signal that appears more than once with a signal received over the telephone line and terminates recording if the two signals are the same.

2. The device of claim 1 in which there are at least N registers and a signal that appears more than once in at least half of said registers.

3. The device of claim 1 including signal measurement means to determine if said signal to be stored in said register exceeds a minimum pulse width before being stored in said register.

4. The device of claim 3 including means for terminating the operation of said telephone answering device upon said signal measurement means, measuring a signal exceeding a maximum value.

5. The device of claim 1 including means for clearing said registers if no signal appears more than once in said registers.

6. The device of claim 5 including counting means for counting the number of times said registers are cleared and limiting means for limiting the number of times said registers may be cleared.

7. The device of claim 1 including means of disabling said registers after the signals in said registers are compared.

8. The device of claim 5 including means for disabling said registers after said compared value is transferred to said microprocessor.

9. The device of claim 1 including voice activated circuitry and status storage means for indicating whether a false calling party control (CPC) signal not equal to the signal appearing more than once has been generated on the line and means for activating said voice activated circuitry if said false CPC signal has been indicated.

10. An improved method of terminating the operation of a telephone device having means for responding to a ringing of the telephone so as to activate the playing of an outgoing message and the recording of an incoming message from the caller over the telephone line, and means for terminating the recordation of the incoming message upon the caller hanging up, wherein the improvement comprises the steps of:

storing one signal from each of a number of prior calls in a plurality of signal storage registers;

comparing the values stored in said storage registers with one another to determine if a predetermined number of said signals are equal to one another;

storing the value of the signal appearing in the predetermined number of said storage registers in a microprocessor;

comparing a suspected calling party control (CPC) signal with the signal stored in said microprocessor; and controlling the operation of said telephone answering device if said signal stored in the microprocessor and said suspected CPC signal are the same.

11. The method of claim 10 including the step of first determining if a signal exceeds a predetermined maximum value and terminating said operation of said telephone answering device if said signal exceeds said maximum value.

12. The method of claim 10 including the step of determining if there is a voice signal on the telephone line and if there has been a signal not the same as the signal in the microprocessor.

* * * * *